United States Patent [19]

Guyot

[11] Patent Number: 5,058,428
[45] Date of Patent: Oct. 22, 1991

[54] PROCESS FOR THE DETERMINATION OF UNBALANCE

[75] Inventor: Volker Guyot, Buttelborn, Fed. Rep. of Germany

[73] Assignee: Schenck Auto-Service-Gerate GmbH, Fed. Rep. of Germany

[21] Appl. No.: 432,058

[22] Filed: Nov. 6, 1989

Related U.S. Application Data

[63] Continuation of Ser. No. 187,529, filed as PCT EP86/00195 on Mar. 29, 1986, abandoned.

[51] Int. Cl.⁵ .............................................. G01M 1/28
[52] U.S. Cl. .................................................... 73/457
[58] Field of Search ......................... 73/457, 460, 462; 324/175

[56] References Cited

U.S. PATENT DOCUMENTS

| | | | |
|---|---|---|---|
| 2,618,971 | 11/1952 | Herzegh | 73/457 |
| 3,686,955 | 8/1972 | Butler | 73/457 |
| 3,719,886 | 3/1973 | Vanderberg et al. | 324/175 |
| 3,726,145 | 4/1973 | Bedford et al. | 73/457 |
| 4,162,445 | 7/1979 | Campbell | 324/175 |
| 4,554,833 | 1/1985 | Goebel | 73/457 |

FOREIGN PATENT DOCUMENTS

| | | |
|---|---|---|
| 1698111 | 6/1971 | Fed. Rep. of Germany . |
| 2819687 | 11/1979 | Fed. Rep. of Germany . |
| 1129477 | 10/1968 | United Kingdom . |
| 2027541 | 2/1980 | United Kingdom . |

Primary Examiner—John E. Chapman
Attorney, Agent, or Firm—Connolly & Hutz

[57] ABSTRACT

A method and apparatus is provided for determining the unbalance of the wheels of a motor vehicle under test by means of unbalance measuring equipment. Such equipment is operated with a d.c. voltage supply in the form of the battery of the vehicle under test which functions as the sole source of that supply. The driven wheels of the vehicle under test are accelarated by the vehicle engine until a constant wheel speed is obtained within a given range. The unbalance values of the driven wheels at constant wheel speed are determined and appropriate correction is made. Wheel driving structure may also be provided for rotating the non-driven wheels of the vehicle under test to determine the unbalance of these wheels. The wheel driving structure for rotating the non-driven wheels is also powered by a d.c. voltage source in the form of the vehicle battery.

3 Claims, 2 Drawing Sheets

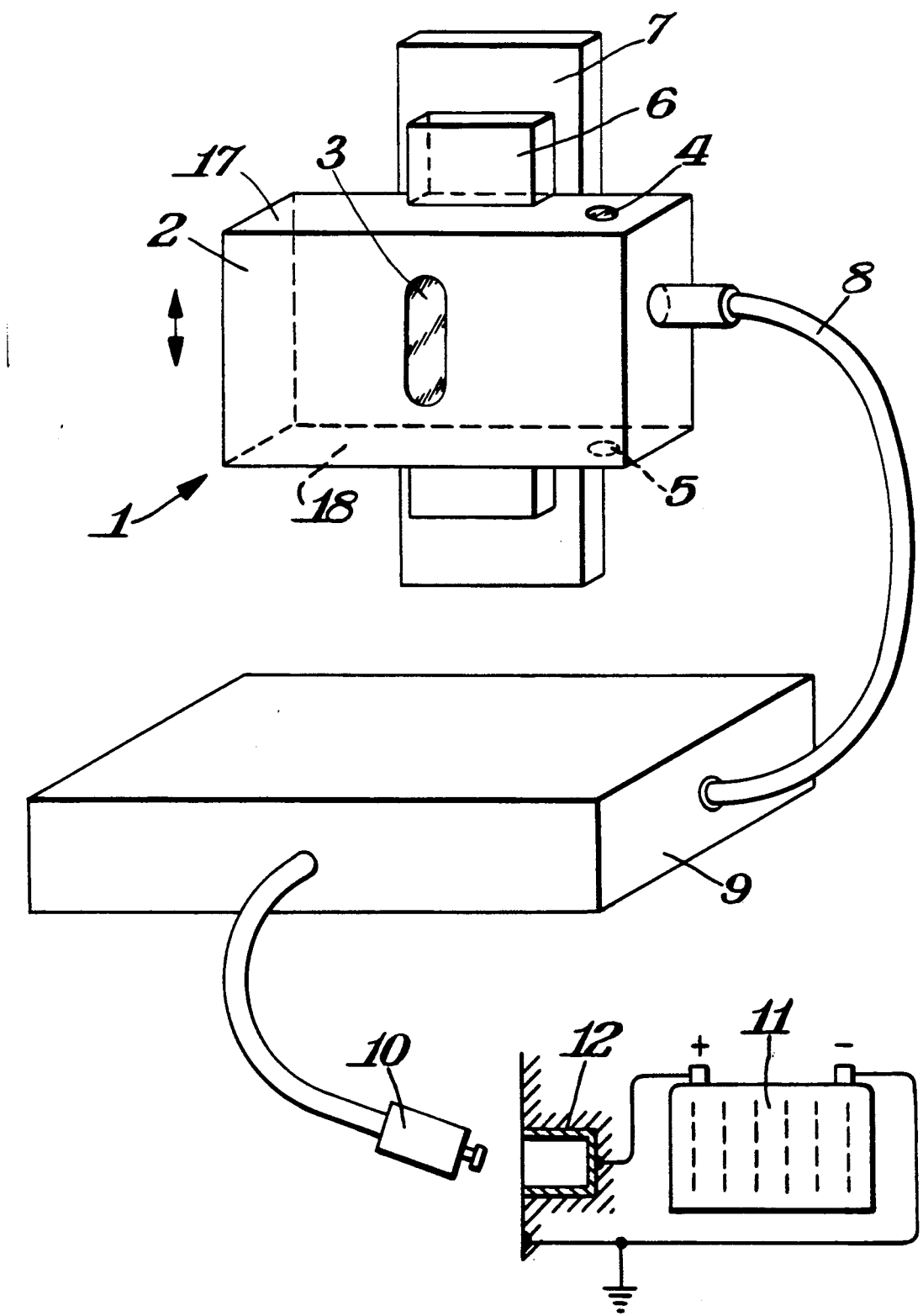

5,058,428

PROCESS FOR THE DETERMINATION OF UNBALANCE

CROSS-REFERENCE TO RELATED APPLICATION

The present application is a continuation of application Ser. No. 187,529, filed as PCT EP86/00195 on Mar. 29, 1986, now abandoned.

BACKGROUND OF THE INVENTION

A method of determining the out-of-balance effects on driven wheels of a motor vehicle and apparatus for supplying direct current to a device for measuring out-of-balance arranged on the motor vehicle.

The invention relates to a method of determining the out-of-balance effects on driven wheels of a motor vehicle using a device for measuring out-of-balance including oscillation converters and reference-mark scanning devices, and to an apparatus for supplying d.c. voltage to an out-of-balance measuring device, including drivers, oscillation converters and reference-mark scanning equipment, arranged on the motor vehicle.

An out-of-balance measuring device with oscillation converters and reference-mark scanning equipment has become known through a brochure of Messrs. Hofmann "Neue Qualitats-dimensionen under Rationalisierungswirkung durch Infra-rot abtastung finishbalancer lpi" dated February 1984. In this case, the electrical supply of the out-of-balance measuring instrument and of the associated auxiliary equipment is effected by means of alternating current. Apart from the limited usefulness of such a device, because of its dependence on the alternating-current supply, there is also the danger that dangerous potential differences may occur between the vehicle chassis, mounted in an insulated manner through the motor vehicle wheels, and the person operating the out-of-balance measuring equipment, which endanger the life of the operator. This also applies in particular when wheels of lorry and trailer combinations or articulated buses have to be balanced in the open air regardless of the weather. Independently of these dangers, because of the extended area—motor vehicle, lorry, articulated bus—of such a measuring arrangement, induction loops will also form and influence the measurement result, for example producing fluctuations in the indication, or even falsifying it—false measurement result. In addition, with the balancing device thus known, including the auxiliary equipment, it is necessary to align the motor vehicle to be examined with the measuring equipment, particularly for the purpose of scanning the marks provided on the motor-vehicle wheel. For this purpose, it is necessary to carry out several test runs with regard to the recognition of the markings on the wheels, which is not only expensive but also pollutes the environment as a result of the increased amount of exhaust gases expelled. In addition, with remote control for measuring the unbalance of both driving wheels, a differential speed monitoring must be continuously effected from the driver's seat in order to avoid overloading of the differential gear.

SUMMARY OF THE INVENTION

Starting from this, it is the object of the present invention to allow operational balancing of the wheels of a motor vehicle to be carried out by a single person, without alignment of the vehicle wheels to a reference-mark scanning device, and at the same time to avoid the dangers arising from connecting the measuring instruments to alternating current. This problem is solved by a method of working wherein the d.c. voltage supply of the out-of-balance measuring equipment, of the oscillation converters and of the reference-mark scanning equipment is undertaken by the vehicle battery, that a reference-mark scanning device and an oscillation converter are associated with each driven wheel, that the speed of rotation of each wheel is transmitted to the out-of-balance measuring device, without a test run, at a constant speed—produced by the operator by pressing the accelerator—and that, in the appropriate speed range of the wheels, when the desired number of revolutions have been reached, the out-of-balance values are taken by the operator in the same measuring run and supplied to the out-of-balance measuring device. By this means, the effects for the operator of dangerous potential differences between vehicle and power supply are completely eliminated. The influences and falsification which hitherto necessarily occurred are avoided. Furthermore, as a result of the absence of test runs with internal combustion engines during the adjustment of the reference-mark scanning equipment, the pollution of the environment is reduced to a minimum.

The object on which the invention is based can also be achieved either by the use of the d.c. voltage source present in the motor vehicle or by a d.c. voltage source which can be built into the driving means and whereby both the measuring device and also the oscillation converters and the reference-mark scanning equipment are supplied with the necessary voltage.

The apparatus for carrying out the method according to the invention or embodiment of the apparatus according to the invention is characterized by the provision of at least one magnetic means for holding the housing of the reference-mark scanning equipment on a holder or on the driving means, and by the provision of inspection apertures in the housing through which the response of the reference-mark scanning equipment to the markings provided on the motor vehicle wheels can be ascertained by moving the wheel markings in front of the reference-mark scanning equipment by hand. If the reference-mark scanning equipment does not respond to the marking provided on the wheel, it is very easily possible, by means of the magnetic means for holding the housing on the holder, to adjust the reference-mark scanning equipment, which is constructed, for example, in the form of an infrared scanning device or of a scanning device consisting of laser and diode, to the appropriate height and distance from the reference mark. As a result, particularly with one-man operation, the usual test runs are eliminated which necessarily require the operator to leave the motor vehicle to be examined and not only to re-adjust the vehicle in relation to the reference-mark scanning device by means of additional aids such as a vehicle jack but also to bring the oscillation converters again into contact with the suspension of the motor-vehicle wheel.

BRIEF DESCRIPTION OF THE DRAWING

The invention is explained in more detail in the following drawing. Illustrated diagrammatically:

FIG. 1 shows a reference- mark scanning device according to the invention, including out-of-balance measuring instrument and voltage supply;

DETAILED DESCRIPTION OF THE INVENTION

Figure 2:
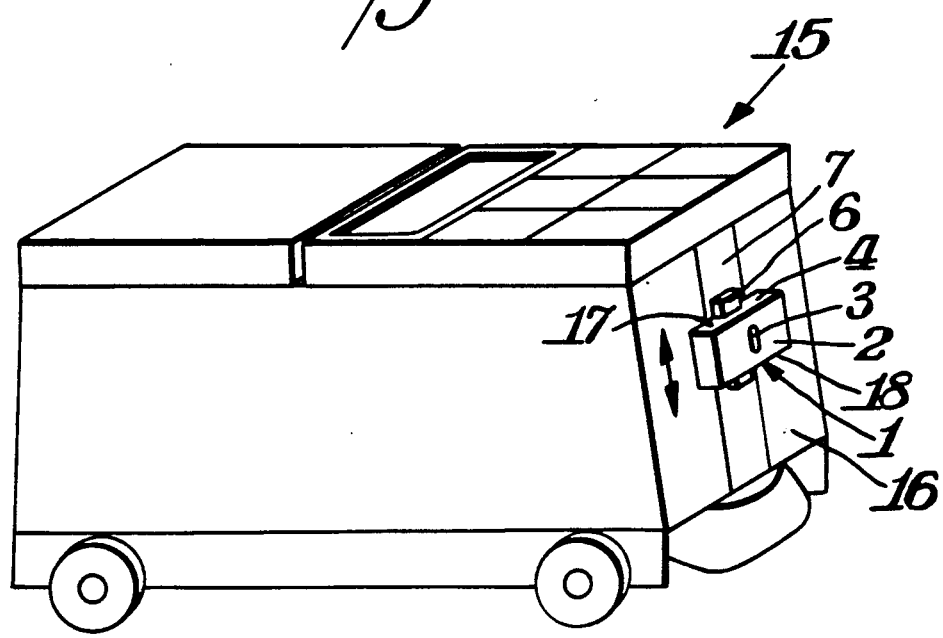
FIG. 2 shows a driving means with a reference-mark scanning device.

A housing 1 of a reference-mark scanning device has at its side 2 adjacent to a motor-vehicle wheel, an aperture 3 which is symmetrical in relation to the middle of the housing 1 for example and in which an optoreceiver and optotransmitter (not illustrated), for example infrared, laser, are contained. As a result of the symmetrical arrangement, the housing can be used for every wheel on the motor vehicle without further conversion work. As a result of the arrangement of inspection apertures 4,5 which can be illuminated, in faces 17, 18 which are orthogonal to the side 2 and substantially parallel to the support surface of the motor vehicle, which apertures light up if the marking provided on the motor-vehicle wheel has been detected by the optoreceiver, the reference-mark scanning device with its housing 1 can be adjusted with regard to the distance of the reference-mark scanning device from the motor-vehicle tires, without an additional test run, solely by moving the wheel with its marking in front of the housing 1. As a result of the arrangement of at least one magnetic holding means 6 at the back of the housing 1, the housing 1, which carries the reference-mark scanning device, can be adjusted on a holder 7 in height in relation to the motor-vehicle wheel, or it can be displaced, as illustrated diagrammatically in FIG. 2, on an end face 16 of a driving means 15, as illustrated by a double arrow.

The housing 1 is connected, through a cable 8, to an out-of-balance measuring device 9 which, according to the example of embodiment shown in FIG. 1, receives its voltage via a lead 10 from a motor-vehicle battery 11, via a socket 12, for example the cigar lighter built into the motor vehicle.

Figure 3:
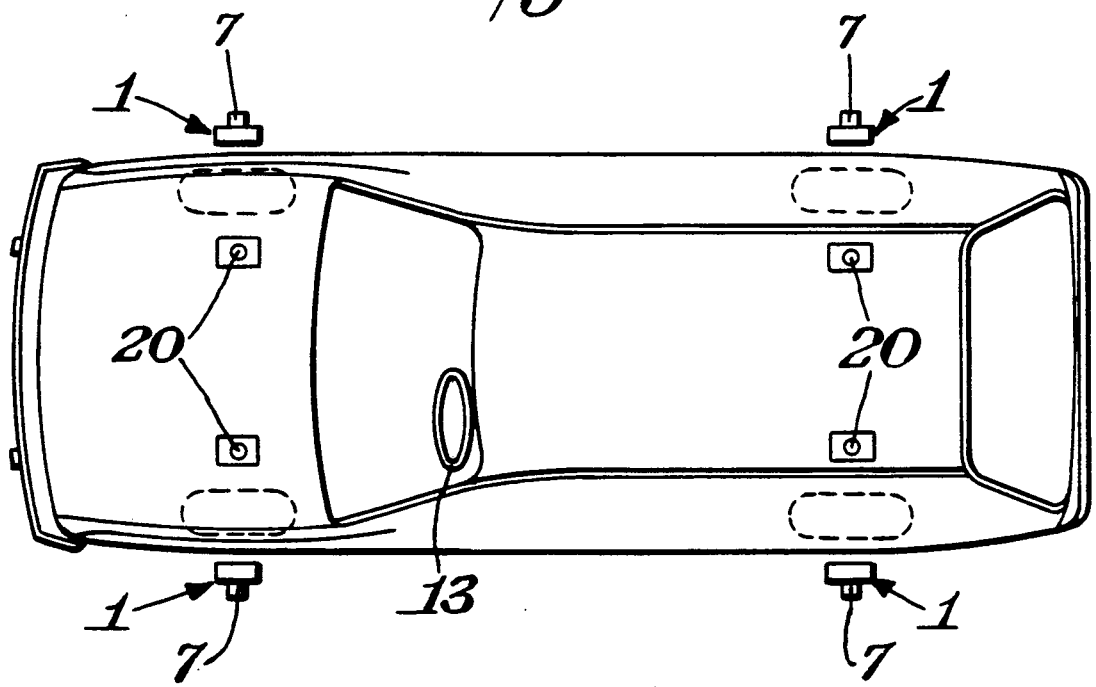
FIG. 3 shows a motor vehicle to be examined, in plan view and projection, in order to explain the method of measuring according to the invention.

In FIG. 3, in plan view, for example in the case of a four-wheel drive vehicle, four housings 1 are provided which are secured to four holders 7 by means of the holding means described in FIG. 1. After the vehicle has been supported on oscillation converters 20, as illustrated in FIG. 3, the person carrying out the examination will, after the four housings 1 with the reference-mark scanning devices have been adjusted in relation to the wheels, get behind the steering wheel 13, start the motor vehicle and, at an appropriate speed, both the out-of-balance measured values from the oscillation converters and the reference marks from the four reference-mark scanning devices are fed into the out-of-balance measuring device 9 which receives its voltage supply via the electric cigar lighter 12 disposed in the motor vehicle. The transmission to the out-of-balance measuring device may be effected by wire or radio.

In the embodiment described herein, each of the four wheels of a vehicle may be tested. After the four wheels are elevated from the support surface the vehicle engine is accelerated until the speed of the wheels is within a given range. The unbalance measurement is then carried out in known fashion. With non-driven wheels, wheel drive structure is provided for rotating those wheels to a speed within the given range of wheel speed. Once this is achieved the unbalance measurement is also carried out on these non-driven wheels.

In the unbalance-measuring device 9, the electrical value, which is generated by the unbalance oscillation in the oscillation converter, is brought together in a known manner with the angle value or the reference-mark value. As is well known in the wheel balancing art, the result obtained from these two values represents the unbalance of a body in terms of position and amount.

The oscillation converters measure the unbalance and transmit the corresponding electrical signal to the unbalance-measuring device 9. This transmission cable is not shown; only transmission cable 8 is shown in FIG. 1 and it also transmits data gathered in the housing 1 to the unbalance-measuring device 9.

A supply of direct current tot eh unbalance-measuring device 9 is necessary so that the electrical values pertaining to the unbalance effect and the angle position can be electrically processed in the unbalance-measuring device. In the prior art, this device is powered with alternating current. However, in the present invention, the battery of the vehicle under test is used as the source of direct current for the unbalance-measuring device, the oscillation converter and the reference-mark sensors.

FIG. 1 illustrates an example of a car battery 11 connected to the unbalance-measuring device 9 via a connecting socket 12, which is, for example, the cigarette lighter of the car and into which a line 10 can be inserted. The essence of the invention lies in the fact that, instead of using an alternating current supply and the necessary converter to generate the direct current needed for the measuring device, the source of direct current already available in the vehicle is directly used. As a result, all of the disadvantages of the prior art are eliminated. The evaluation of the measured unbalance in terms of position and size continues to be carried out in a manner well known in this art.

Referring to FIG. 1, the battery 11 is connected to an optical transmitter contained in housing 1 via socket 12, cable 10, unbalance-measuring device 9 and cable 8. The data received from the optical transmitter via the angle position is transmitted via line 8 to the unbalance-measuring device 9 where it is linked with the data from the oscillation converters 20 which have information on the various instances of unbalance that occur in the wheel.

I claim:

1. A method of determining the out-of-balance effects of the wheels of a motor vehicle under test by means of out-of-balance measuring devices, oscillation converters and reference-mark scanning devices, the method comprising the steps of providing an out-of-balance measuring device, an oscillation converter and a reference-mark scanning device for each driven wheel of the vehicle under test, operating the out-of-balance measuring devices, oscillation converters and reference-mark sensors with a d.c. voltage supply and utilizing the battery of the vehicle under test as the sole source of that supply, rotating the driven wheels of the vehicle under test by accelerating the vehicle engine until a constant wheel speed is obtained within a given range, and determining that out-of-balance values of the driven wheels at the constant wheel speed.

2. A method as in claim 1 including the step of rotating each non-driven wheel of the vehicle until a constant wheel speed is obtained within a give range, and determining the out-of-balance values of the non-driven wheels of the vehicle with an out-of-balance measuring device, an oscillation converter and a reference mark scanning device all powered by a d.c. voltage supply, and wherein the vehicle battery is utilized as the sole source of that supply.

3. Apparatus for determining the out-of-balance effects on the wheels of a motor vehicle under test comprising an out-of-balance measuring device, an oscillation converter and a reference-mark scanning device for each vehicle wheel, driving means for rotating the non-driven wheels of the vehicle, both the vehicle under test and the driving means for the non-driven wheels of the vehicle each having a d.c. voltage source, each in the form of a separate battery, and electrical connection between the out-of-balance device, the oscillation converter, the reference-mark scanning device and the battery of the vehicle under test or the battery of the driving means for providing d.c. power thereto, and wherein each reference mark scanning device includes a housing (1) and at least one magnetic holding means (6) for mounting the housing (1), the housing (1) having an aperture (3) in a side (2) adjacent a motor-vehicle wheel under test, an optical transmitter and receiver within the housing beamed through the aperture (3), and the housing (1) having inspection apertures (4,5) in housing faces (17, 18) which faces are substantially parallel to one another and generally horizontally disposed.

* * * * *